(12) United States Patent
Matsubara et al.

(10) Patent No.: US 8,916,115 B2
(45) Date of Patent: Dec. 23, 2014

(54) NICKEL RECOVERY LOSS REDUCTION METHOD, HYDROMETALLURGICAL METHOD FOR NICKEL OXIDIZED ORE, AND SULFURATION TREATMENT SYSTEM

(75) Inventors: Satoshi Matsubara, Tokyo (JP); Osamu Nakai, Tokyo (JP); Hiroyuki Mitsui, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 14/237,767

(22) PCT Filed: Aug. 9, 2012

(86) PCT No.: PCT/JP2012/070378
§ 371 (c)(1),
(2), (4) Date: Feb. 7, 2014

(87) PCT Pub. No.: WO2013/027603
PCT Pub. Date: Feb. 28, 2013

(65) Prior Publication Data
US 2014/0170040 A1  Jun. 19, 2014

(30) Foreign Application Priority Data
Aug. 22, 2011  (JP) .................................. 2011-180298

(51) Int. Cl.
| | | |
|---|---|---|
| C01G 53/00 | (2006.01) | |
| C01G 53/11 | (2006.01) | |
| C22B 3/04 | (2006.01) | |
| C22B 3/44 | (2006.01) | |
| B01J 10/00 | (2006.01) | |
| B01J 19/00 | (2006.01) | |
| C22B 3/00 | (2006.01) | |
| C22B 3/02 | (2006.01) | |

(52) U.S. Cl.
CPC ................. *C22B 3/44* (2013.01); *C22B 23/043* (2013.01); *C22B 3/02* (2013.01)
USPC ...... 423/138; 423/140; 423/150.1; 423/561.1; 422/187

(58) Field of Classification Search
USPC ............. 423/138, 140, 150.1, 561.1; 422/187
See application file for complete search history.

(56) References Cited

U.S. PATENT DOCUMENTS 3,809,549 A * 5/1974 Opratko et al. ............... 423/140
4,073,860 A * 2/1978 Huggins et al. ............... 423/140
(Continued)

FOREIGN PATENT DOCUMENTS

JP  A-2004-352521  12/2004
JP  A-2005-350766  12/2005
(Continued)

OTHER PUBLICATIONS

International Search Report issued in International Application No. PCT/JP2012/070378 dated Oct. 9, 2012 (with translation).

*Primary Examiner* — Timothy Vanoy
(74) *Attorney, Agent, or Firm* — Oliff PLC

(57) ABSTRACT

A nickel recovery loss reduction method that makes it possible to reduce nickel recovery loss by lowering the concentration of fine floating solid components in overflow liquid in precipitating and separating treatments, and consequently to further reduce a nickel recovery loss, a hydrometallurgical method for nickel oxidized ore to which the nickel recovery loss reduction method is applied, and a sulfurizing treatment system. The present invention is a nickel recovery loss reduction method in a sulfurizing step for blowing hydrogen sulfide gas into a nickel containing sulfuric acid aqueous solution to generate nickel-containing sulfides and a barren liquid, and the nickel-containing sulfides with the average particle size adjusted to a predetermined size or larger are added as seed crystals to the sulfuric acid aqueous solution. It is more preferable to adjust the average particle size of the nickel sulfides to be added as seed crystals to 55 μm or more.

4 Claims, 2 Drawing Sheets

(56) References Cited

U.S. PATENT DOCUMENTS

2002/0031463 A1* 3/2002 White .......................... 423/138
2010/0135878 A1* 6/2010 Shibayama et al. ....... 423/150.1

FOREIGN PATENT DOCUMENTS

| | | |
|---|---|---|
| JP | A-2008-231470 | 10/2008 |
| JP | A-2009-173983 | 8/2009 |

* cited by examiner

US 8,916,115 B2

NICKEL RECOVERY LOSS REDUCTION METHOD, HYDROMETALLURGICAL METHOD FOR NICKEL OXIDIZED ORE, AND SULFURATION TREATMENT SYSTEM

FIELD OF THE INVENTION

This invention relates to a nickel recovery loss reduction method, a hydrometallurgical method for nickel oxidized ore and a sulfurizing treatment system, and more specifically concerns a reduction method for a nickel recovery loss in a sulfurizing step in which by blowing a hydrogen sulfide gas into a sulfuric acid aqueous solution containing nickel so as to form sulfides containing nickel and a barren liquid, a hydrometallurgical method for nickel oxidized ore to which the reduction method is applied, and a sulfurizing treatment system.

The present application asserts priority rights based on JP Patent Application 2011-180298 filed in Japan on Aug. 22, 2011. The total contents of disclosure of the Patent Application of the senior filing date are to be incorporated by reference into the present Application.

BACKGROUND OF THE INVENTION

Conventionally, in a nickel metallurgical method, a mat having a nickel quality of about 30% by weight is obtained by carrying out a dry metallurgical treatment on nickel sulfide ores, and electrolytic nickel is then produced by using a chloride leach-electrolytic harvest method.

In recent years, as the hydrometallurgical method for nickel oxidized ores, a high-temperature pressure acid leach method using sulfuric acid has drawn public attentions. Different from a dry metallurgical method that is a conventional generally-used metallurgical method for nickel oxidized ores, this method does not include dry processes such as reducing and drying processes or the like, and is composed of consistent wet processes so that this method is advantageous from the viewpoints of energy and costs. Moreover, this method is also advantageous in that sulfides (hereinafter, referred to also as "nickel sulfides") containing nickel, whose nickel quality has been improved to about 50% by weight, can be obtained. These nickel sulfides can be precipitated and generated through processes in which, after purifying a leached liquid obtained by leaching nickel oxidized ores, by blowing a hydrogen sulfide gas thereto in a sulfurizing process, a sulfurizing reaction is exerted (for example, see Patent Document 1).

In this case, the nickel sulfides that are precipitated and generated by blowing a hydrogen sulfide gas into a sulfuric acid aqueous solution containing nickel obtained by leaching nickel oxidized ores are recovered by carrying out precipitating and separating treatments on a slurry containing the nickel sulfides by the use of a solid-liquid separation device such as a thickener or the like. More specifically, in the precipitating and separating treatments, the nickel sulfides corresponding to a precipitate in the sulfide slurry obtained by the sulfurizing reaction are recovered from the bottom of the solid-liquid separation device, while an aqueous solution component in the slurry is overflowed and recovered as an overflow liquid that forms a barren liquid.

At this time, in conventional precipitating and separating treatments, a large amount of fine floating solid components are undesirably contained in the overflow liquid that is overflowed. The floating solid components are composed of fine nickel sulfides that have not been formed into precipitates to remain in the aqueous solution, and overflowed, as they are, to be formed into a barren liquid, and finally subjected to a neutralizing treatment or the like and then discharged out of the factory together with the leached residues. For this reason, the floating solid components, which are composed of fine nickel sulfides remaining in the overflow liquid and are discharged out of the system, cause a loss in the nickel recovery.

Conventionally, a method has been proposed as a technique in the sulfurizing process in which by repeatedly adding sulfides containing nickel and cobalt obtained after the sulfurizing process to a sulfuric acid aqueous solution containing nickel that serves as a starting liquid as seed crystals so that the added amount of seed crystals is managed so as to form a ratio of 4 to 6 of the nickel amount contained in the seed crystals relative to the nickel amount contained in the starting liquid; thus, a nickel recovery rate can be increased (for example, see Patent Document 2).

However, the technique described in Patent Document 2 is designed to increase the nickel recovery rate by suppressing adhesion of the generated sulfides onto the inner surface of the reaction solution, and this technique for controlling the added amount of seed crystals fails to reduce the concentration of fine floating solid components in an overflow liquid in precipitating and separating treatments after the sulfurizing process.

In view of these circumstances, there have been strong demands for a nickel recovery loss reduction method that makes it possible to reduce the nickel recovery loss by reducing the concentration of the fine floating solid components in the overflow liquid, and consequently to further enhance the nickel recovery rate.

PRIOR-ART DOCUMENTS

Patent Document

PTL 1: Japanese Patent Application Laid-Open No. 2005-350766
PTL 2: Japanese Patent Application Laid-Open No. 2008-231470

SUMMARY OF THE INVENTION

In view of these circumstances, the present invention has been proposed, and its object is to provide a nickel recovery loss reduction method that makes it possible to reduce a nickel recovery loss by reducing a concentration of fine floating solid components in an overflow liquid obtained from precipitating and separating treatments and consequently to further improve a nickel recovery rate, and a hydrometallurgical method for nickel oxidized ores to which the nickel recovery loss reduction method is applied, as well as a sulfurizing treatment system.

The inventors of the present invention have made extensive studies in order to achieve the above-mentioned object and found that in a sulfurizing step, by adding sulfides containing nickel that have been adjusted so as to have an average particle size of a predetermined size or larger thereto as seed crystals, the concentration of fine floating solid components in the overflow liquid can be reduced, thereby completing the present invention.

That is, the nickel recovery loss reduction method in accordance with the present invention, which relates to a reducing method for a nickel recovery loss in which by blowing a hydrogen sulfide gas into a sulfuric acid aqueous solution containing nickel, a sulfurizing treatment is executed to generate sulfides containing nickel and a barren liquid, is characterized in that sulfides containing nickel, which are adjusted so as to have an average particle size of a predetermined size or larger, are added to the sulfuric acid aqueous solution as seed crystals.

Moreover, in the nickel recovery loss reduction method, the sulfides to be added as the seed crystals preferably have an average particle size of 55 μm or more.

Furthermore, in the nickel recovery loss reduction method, the sulfides to be added as seed crystals are preferably obtained by classifying sulfides containing nickel that have been recovered through a sulfurizing step in a liquid cyclone.

In the nickel recovery loss reduction method, as the sulfuric acid aqueous solution, a mother liquor may be used, which is composed of a sulfuric acid aqueous solution containing nickel and cobalt recovered through a leaching step, a solid-liquid separating step and a neutralizing step in a hydrometallurgical method based upon a high-temperature pressure leaching process for recovering nickel from nickel oxidized ores.

Moreover, the hydrometallurgical method for nickel oxidized ores in accordance with the present invention, which is a hydrometallurgical method for nickel oxidized ores for recovering nickel from the nickel oxidized ores, is characterized by a sulfurizing step in which by adding sulfides containing nickel that are adjusted so as to have an average particle size of a predetermined size or larger to a sulfuric acid aqueous solution containing nickel that is obtained by leaching the nickel oxidized ores with sulfuric acid as seed crystals and by blowing a hydrogen sulfide gas into the sulfuric acid aqueous solution containing nickel, sulfides containing nickel and a barren liquid are formed.

Furthermore, the sulfurizing treatment system in accordance with the present invention, which is a sulfurizing treatment system for use in a sulfurizing treatment in which by blowing a hydrogen sulfide gas into a sulfuric acid aqueous solution containing nickel, sulfides containing nickel and a barren liquid are generated, is characterized by including: a stirring reaction vessel to which the sulfuric acid aqueous solution is loaded and in which by blowing the hydrogen sulfide gas to the sulfuric acid aqueous solution, the sulfurizing reaction is carried out; a precipitation vessel for precipitating and separating a sulfide slurry generated by the sulfurizing reaction into the sulfides and the barren liquid; a relay vessel for holding the sulfides separated in the precipitation vessel and for distributing the sulfides at a predetermined ratio; and a classifying device for classifying a predetermined amount of the sulfides distributed in the relay vessel at a predetermined classifying point, and in the classifying device, the sulfides are adjusted so as to have an average particle size of a predetermined size or larger, and the sulfides that have been particle-size adjusted are circulated and supplied to the stirring reaction vessel by using a pump, and in the stirring reaction vessel, a sulfurizing reaction is carried out by using the sulfides that have been average particle size adjusted to a predetermined particle size or larger as seed crystals.

Effects of Invention

In accordance with the present invention, since the sulfurizing reaction is carried out, with the sulfides containing nickel that have been average particle size adjusted so as to have a predetermined particle size or larger being added as seed crystals, it is possible to reduce a concentration of fine floating solid components containing nickel in an overflow liquid overflowed in precipitating and separating treatments by using, for example, a thickener or the like, and consequently to increase a nickel content to be recovered as sulfides, thereby reducing the nickel recovery loss.

In particular, in the hydrometallurgical method based upon a high-temperature pressure leaching process for recovering nickel from nickel oxidized ores, the present invention is effectively applicable to a sulfurizing step in which by blowing a hydrogen sulfide gas into the sulfuric acid aqueous solution containing nickel and cobalt, sulfides containing nickel and cobalt as well as a barren liquid are formed.

DETAILED DESCRIPTION OF THE INVENTION

Figure 1:
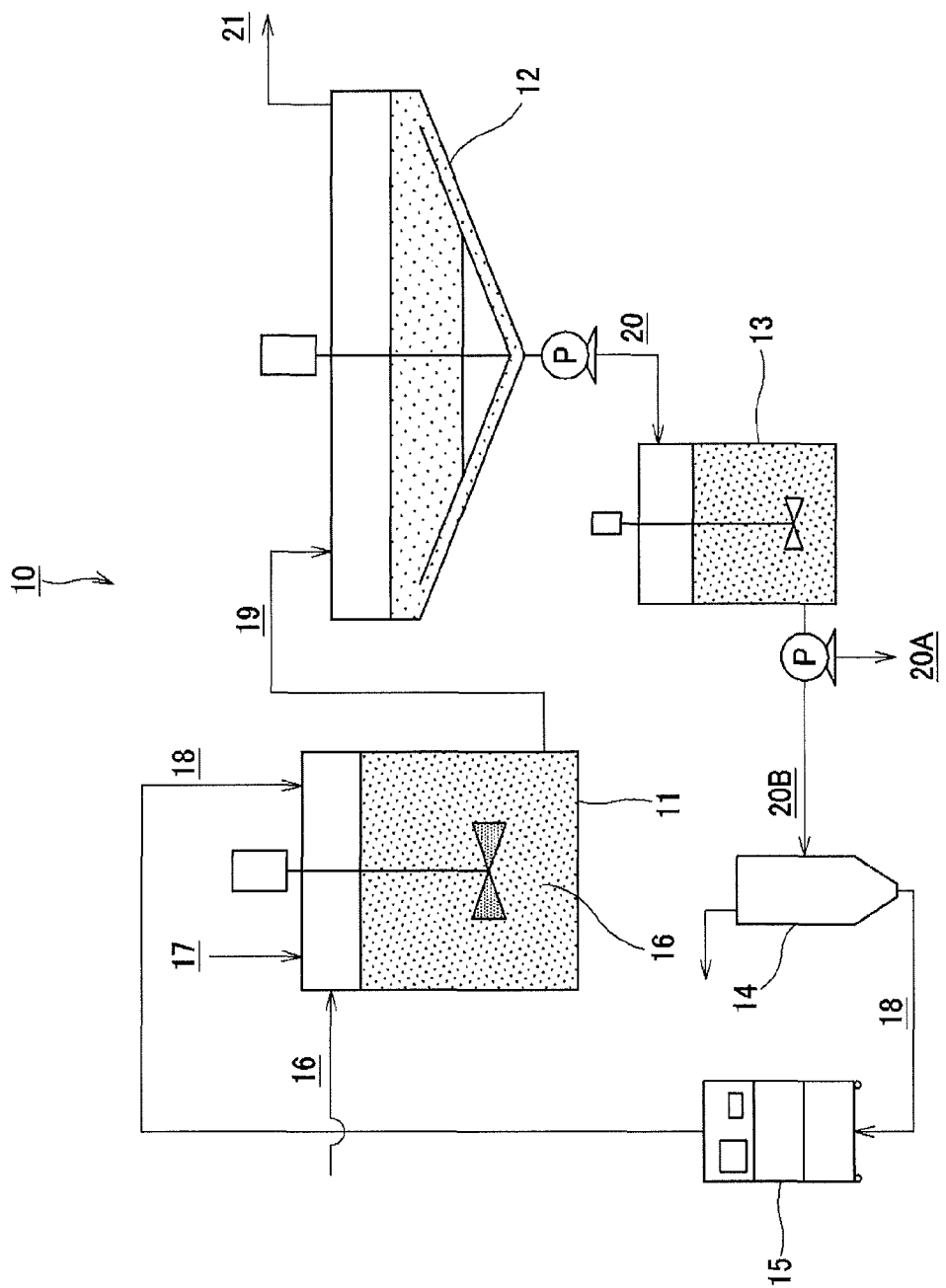
FIG. 1 is a schematic view showing one example of a sulfidizing treatment system for use in a sulfidizing process.

The following description will discuss specific embodiments of the present invention (hereinafter, referred to as "present embodiment") in detail in accordance with the following order. Additionally, the present invention is not intended to be limited only by the following embodiments, and it is needless to say that various modifications may be made therein within a scope not departing from the gist of the present invention.
1. Nickel Recovery Loss Reduction Method
2. Sulfurizing Treatment System in Sulfurizing Step
3. Hydrometallurgical Method for Nickel oxidized ore
4. Examples 1. Nickel Recovery Loss Reduction Method A nickel recovery loss reduction method in accordance with the present embodiment relates to a sulfurizing step in which by blowing hydrogen sulfide gas into a nickel containing sulfuric acid aqueous solution, a sulfurizing reaction is carried out to generate nickel-containing sulfides and a barren liquid. Moreover, the nickel recovery loss reduction method relating to the present embodiment is characterized in that in the sulfurizing step, by adding nickel-containing sulfides with an average particle size adjusted to a predetermined size or larger as seed crystals to a nickel-containing sulfuric acid aqueous solution (starting liquid), the sulfurizing reaction is carried out.

In this manner, by using the nickel-containing sulfides (hereinafter, referred to also as "nickel sulfides") with an average particle size adjusted to a predetermined size or larger as seed crystals, the sulfurizing reaction is generated so that the nickel content of sulfides that are precipitation-produced is increased so that upon carrying out precipitating and separating treatments, it is possible to reduce the concentration of fine floating solid components containing nickel, which are contained in an overflow liquid.

That is, the nickel sulfides added as seed crystals are allowed to form cores for the generation of sulfides that are newly generated and deposited by the sulfurizing reaction so that the particles of the generated sulfides are made larger. Moreover, in this case, by adding the nickel sulfides with an average particle size adjusted to a predetermined size or larger, the function as the cores for the generation of sulfides can be more effectively exerted so that the precipitation property of the particles containing fine nickel that are present in the solution is increased and the fine particles can be sufficiently precipitated as a precipitant of sulfides. Therefore, fine floating solid components, which have been contained in the overflow liquid in a conventional precipitating and separating treatments after the sulfurizing reaction, can be effectively precipitated as one portion of the precipitate of the sulfides generated by the sulfurizing step; thus, it becomes possible to reduce the concentration of the fine floating solid components contained in the overflow liquid, and consequently to effectively reduce the nickel recovery loss.

In this case, with respect to the nickel sulfides to be added as crystal seeds, those having an average particle size adjusted to 50 µm or more are preferably used, and those having an average particle size adjusted to 55 µm or more are more preferably used. By adding the nickel sulfides whose particle size is adjusted to 50 µm or more, more preferably, to 55 µm or more, as crystal seeds, the concentration of the fine floating solid components containing nickel that are contained in the overflow liquid can be effectively reduced. Additionally, the upper limit value of the average particle size of the nickel sulfides to be added is preferably set to, for example, 100 µm or less. In the case of the nickel sulfides whose particle size is adjusted to more than 100 µm, the effect for reducing the concentration of the fine floating solid components contained in the overflow liquid is no longer obtained, and this case is not efficient from the viewpoint of particle-size adjustments as well.

With respect to the particle-size adjusting method for the nickel sulfides to be added, although not particularly limited, by using a wet (liquid) cyclone, a vibration sieve or the like, a classifying treatment may be carried out at a classifying point determined so as to set the average particle size of nickel sulfides to a predetermined size or larger. In particular, the classifying treatment is preferably carried out by using a liquid cyclone. In the liquid cyclone, the nickel sulfides are made to collide and in contact with one another, and a granulating process proceeds so that the particle-size adjusting process is more effectively carried out so as to provide a desired average particle size. Moreover, in the case when sulfides obtained in the sulfurizing step are circulated and used as crystal seeds as will be described later, unnecessary slurry components or the like can be separated.

Additionally, in the case when the particle size of the sulfides is too large, prior to the classifying treatment, for example, a grinding process may be carried out on the nickel sulfides by using a general-use grinder such as a ball mill, a rod mill, an AG mill or the like, if necessary.

As to whether or not the average particle size of the sulfides that have been particle-size adjusted as described above is made to have the predetermined particle size or larger, prior to the addition thereof to a sulfuric acid aqueous solution, a grain size measuring process may be carried out, for example, by using a laser diffraction method, or the like. In this manner, after the particle-size adjustment such as the classifying treatment or the like, by carrying out the particle-size measuring process prior to the addition of the nickel sulfides to the sulfuric acid aqueous solution, nickel sulfides whose average particle size is greater than a desired size or more can be positively added as seed crystals.

Moreover, with respect to the nickel sulfides to be added, one portion of the sulfides containing nickel newly precipitated and generated by the sulfurizing reaction in the sulfurizing step is preferably circulated and again used. That is, the sulfides containing nickel generated by the sulfurizing reaction are precipitated and separated so as to be recovered, and a predetermined amount of recovered sulfides are classified as described above, or after having been subjected to the grinding process, if necessary, are classified so that the resulting nickel sulfides are circulated and supplied to a reaction container for use in the sulfurizing reaction by using a pump or the like. In this manner, the predetermined amount of the nickel sulfides that are newly precipitated and generated and thus obtained in the sulfurizing step can be circulated and used again after the average particle size thereof has been adjusted; thus, it becomes not necessary to prepare nickel sulfides serving as the seed crystals in a separate manner so that it is possible to carry out the processes more efficiently.

Moreover, with respect to the added amount of the nickel sulfides, although not particularly limited, it is preferable to add nickel sulfides having an amount corresponding to 4 to 6 times greater than the amount of nickel in the nickel-containing sulfuric acid aqueous solution. Thus, it becomes possible to sufficiently suppress the generated sulfides from adhering onto the inner surface of the reaction container for use in the sulfurizing reaction, and consequently to reduce the concentration of nickel to be contained in a barren liquid. As a result, it becomes possible to further reduce the nickel recovery loss. Additionally, in the case of the added amount of less than 4 times, the nickel concentration in the barren liquid might increase to cause an increase in the nickel recovery loss, and in contrast, in the case of the added amount of more than 6 times, further effects are no longer expected to cause inefficiency.

As the sulfuric acid aqueous solution serving as the initial solution, not particularly limited, sulfuric acid aqueous solutions containing nickel and/or cobalt may be widely used. Among these, a mother liquor, which is composed of a sulfuric acid aqueous solution containing nickel and cobalt recovered through the leaching step, a solid-liquid separating step and a neutralizing step in a hydrometallurgical method based upon a high-temperature pressure leaching process for use in recovering nickel from nickel oxidized ores, is preferably used. Since the sulfuric acid aqueous solution obtained by leaching nickel oxidized ores through the high-temperature pressure leaching process is derived from nickel or the like leached at a high leaching rate, it becomes possible to recover nickel at a high recovery rate by using this sulfuric acid aqueous solution.

Although not particularly limited, the reaction temperature of the sulfurizing reaction in the sulfurizing step is preferably set to, for example, 70 to 95° C., more preferably, to about 80° C. Although the sulfurizing reaction itself is generally accelerated as the temperature becomes higher, in the case of more than 95° C., many problems arise in that, for example, high costs are required for raising the temperature and the adhesion of sulfides to the reaction container occurs due to a high reaction speed.

2. Sulfurizing Treatment System in Sulfurizing Step

The following description will discuss a device facility of a sulfurizing treatment system for use in the sulfurizing step to which the above-mentioned nickel recovery loss reduction method is applied. FIG. 1 is a schematic drawing that shows the device facility structure of a sulfurizing treatment system 10. As described earlier, as the sulfurizing treatment system, for example, a system in which one portion of nickel sulfides newly generated in the sulfurizing step are circulated and again utilized may be used.

As shown in FIG. 1, the sulfurizing treatment system 10 is constituted by a stirring reaction vessel 11 in which a sulfurizing reaction is carried out, a precipitation vessel 12 in which a sulfide slurry generated by the sulfurizing reaction is precipitated and separated into sulfides containing nickel and a barren liquid, a relay vessel 13 that primarily holds the sulfides separated in the precipitation vessel 12 and distributes them at a predetermined ratio and a classifying device 14 that carries out a classifying treatment on the sulfides (nickel sulfides) distributed in the relay vessel 13 so as to be circulated and used in the sulfurizing reaction at a predetermined classifying point. Moreover, the sulfurizing treatment system 10 is further provided with a grain size measuring device 15 that measures the grain size of the nickel sulfides classified in the classifying device 14.

In the stirring reaction vessel 11, a starting liquid composed of a sulfuric acid aqueous solution 16 containing nickel is loaded at a predetermined flow rate, and by blowing hydrogen sulfide gas 17 into the sulfuric acid aqueous solution 16, a sulfurizing reaction takes place. In the present embodiment, by adding nickel sulfides 18 whose average particle size has been adjusted to a predetermined size or larger as seed crystals to the sulfuric acid aqueous solution 16 loaded into the stirring reaction vessel 11, a sulfurizing reaction is generated.

The precipitation vessel 12 is a precipitation separation device such as, for example, a thickener. In the precipitation vessel 12, a sulfide slurry 19 generated in the sulfurizing reaction in the stirring reaction vessel 1 is sent, and nickel sulfides 20 as its precipitate are separated and recovered from the bottom thereof as a condensed slurry (precipitate), with an aqueous solution component in the sulfide slurry being overflowed so as to be separated and discharged as an overflow liquid 21. The nickel sulfides 20 separated from the bottom of the precipitation vessel 12 are sent to the relay vessel 13, while the overflow liquid 21 is subjected to a neutralizing treatment or the like as a barren liquid in a separated manner and discharged out of the system.

In the relay vessel 13, the nickel sulfides 20 that are precipitates separated from the bottom of the precipitation vessel 12 are primarily held, and distributed into nickel sulfides 20A serving as a recovery portion and nickel sulfides 20B serving as a portion to be circulated and used at a predetermined ratio. The nickel sulfides 20A distributed as the recovery portion in the relay vessel 13 are drawn by a pump or the like, and processed in another process and recovered. On the other hand, the nickel sulfides 20B distributed as the portion to be circulated and used in the relay vessel 13 is sent to a next classifying device 14, and subjected to a classifying treatment. Additionally, in the relay vessel 13, the flow rate of the starting liquid to be loaded to the stirring reaction vessel 11 is measured and adjusted, and in the case when it fluctuates, the circulation flow rate of the nickel sulfides obtained from the precipitation vessel 12 can be adjusted.

In the classifying device 14, the nickel sulfides 20B serving as the portion to be circulated and used, which are distributed through the relay vessel 13, are recovered and subjected to a classifying treatment so as to form nickel sulfides 18 having an average particle size that is a predetermined size or larger. More specifically, in the classifying device 14, the classifying treatment is carried out at a classifying point set so as to carry out particle size adjustments preferably to an average particle size of, for example, 50 μm or more, more preferably, to 55 μm or more. As the classifying device 14, for example, a wet (liquid) cyclone or a vibration sieve or the like, which can carry out a classifying step at a desired classifying point, may be used. Additionally, as the classifying device 14, such a device as to also have a function for grinding nickel sulfides may be used, if necessary, and the nickel sulfides may be subjected to a grinding treatment prior to the classifying treatment.

The nickel sulfides 18, which have been classified in the classifying device 14 and adjusted so as to have an average particle size of a predetermined size or larger, are circulated and supplied to the stirring reaction vessel 11 and used as seed crystals in the sulfurizing reaction.

Moreover, the sulfurizing treatment system 10 may be further provided with a grain size measuring device 15. The grain size measuring device 15 measures the grain size of the nickel sulfides 18 that have been classified at a predetermined classifying point in the classifying device 14. As the grain size measuring device 15, for example, a laser diffraction type grain size measuring device or the like may be used. The grain size measuring device 15 makes it possible to determine whether or not the classified nickel sulfides 18 have an average particle size of a predetermined size or larger.

In this manner, the sulfurizing treatment system 10 for use in the sulfurizing step has a structure in which a predetermined amount of nickel sulfides, generated by the sulfurizing reaction and separated in the precipitation vessel 12, are circulated and supplied to the stirring reaction vessel 11 so as to be used as seed crystals in the sulfurizing reaction. Moreover, the present embodiment is provided with the classifying device 14 which, upon circulating and using the nickel sulfides 18 as seed crystals, can carry out a classifying treatment at a predetermined classifying point on the nickel sulfides 20B recovered through the relay vessel 13 as the portion to be circulated and used, with the average particle size of the nickel sulfides 20B being adjusted. With these arrangements, it is possible to add the nickel sulfides 18 whose particle size has been adjusted to a predetermined size or larger to the sulfuric aqueous solution 16 as seed crystals so as to exert a sulfurizing reaction.

Moreover, it is possible to install the grain size measuring device 15 in succession to the classifying device 14, and consequently to measure the grain size of the nickel sulfides 18 that have been classified. Thus, it becomes possible to add the nickel sulfides 18 that have been preferably adjusted so as to have a predetermined average particle size more precisely to the sulfuric acid aqueous solution 16 as seed crystals.

Since the present embodiment has a device structure in which a sulfurizing reaction is carried out by adding the nickel sulfides 18 that have been adjusted to have a predetermined average particle size or larger in this manner as seed crystals, fine floating solid components contained in the overflow liquid 21 overflowed from the precipitation vessel 12 such as a thickener are allowed to have a reduced concentration so that the nickel recovery loss can be effectively reduced.

3. Hydrometallurgical Method for Nickel Oxidized Ore

The following description will discuss a hydrometallurgical method for nickel oxidized ores including a sulfurizing step to which the above-mentioned nickel recovery loss reduction method is applied. In this case, the hydrometallurgical method using a high-temperature pressure acid leaching method is explained as a specific example.

Figure 2:
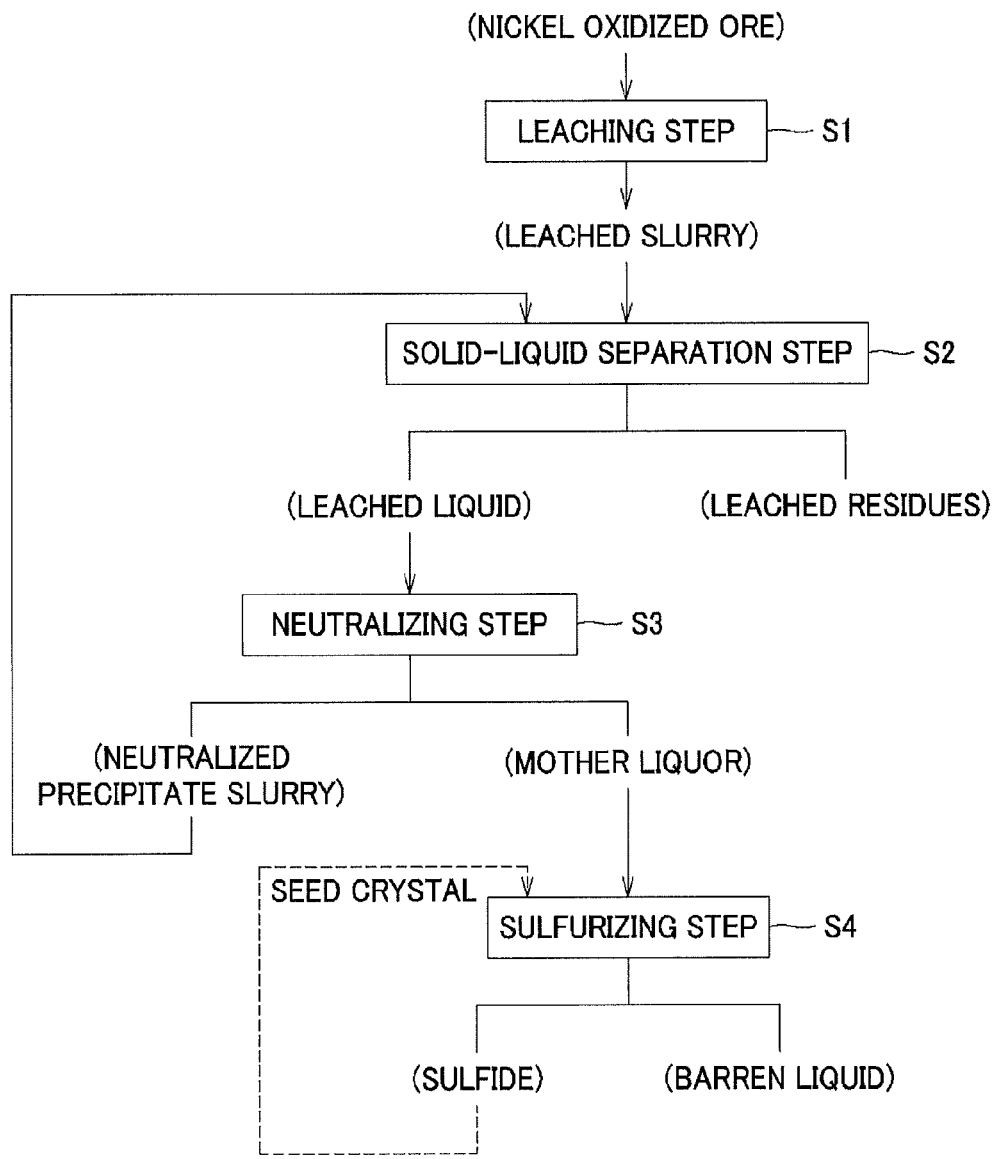
FIG. 2 is a process chart for a hydrometallurgical method for nickel oxidized ores.

FIG. 2 shows one example of a process chart for the hydrometallurgical method using the high-temperature pressure acid leaching method for nickel oxidized ores. As shown in FIG. 2, the hydrometallurgical method for nickel oxidized ores is provided with a leaching step S1 for leaching nickel or the like from nickel oxidized ores, a solid-liquid separation step S2 for solid-liquid separating the resulting leached slurry into a leached liquid and leached residues, a neutralizing step S3 for neutralizing the leached liquid so as to be separated into a mother liquor for use in recovering nickel and a neutralized precipitate slurry, and a sulfurizing step S4 for blowing hydrogen sulfide gas into a sulfuric acid aqueous solution serving as the mother liquor to carry out a sulfurizing reaction so as to obtain sulfides containing nickel and a barren liquid. The following description will discuss the respective processes in more detail.

(Leaching Step)

In leaching step S1, sulfuric acid is added to a slurry of nickel oxidized ores, and a stirring process is carried out thereon at a temperature of 220 to 280° C. so that a leached slurry composed of a leached liquid and leached residues is formed. In leaching step S1, for example, a high-temperature pressure container (autoclave) is used.

As the nickel oxidized ores used in leaching step S1, examples thereof mainly include laterites, such as limonite, saprolite and the like. The nickel content of the laterites is normally in a range from 0.8 to 2.5% by weight, and nickel is contained therein as hydroxides or magnesium silicate minerals (magnesium silicate). Moreover, the iron content thereof is in a range from 10 to 50% by weight, and iron is mainly contained therein as trivalent hydroxides (goethite), with divalent iron being partially contained in the magnesium silicate minerals.

More specifically, in leaching step S1, leaching reactions represented by the following formulas (1) to (5) and a high temperature hydrolysis reaction are caused so that nickel, cobalt and the like are leached as sulfuric acid salts, and the leached iron sulfate is secured as hematite. In this case, however, since the securing process for iron ions does not completely proceed, normally, the resulting leached slurry contains divalent and trivalent iron ions in its liquid portion in addition to nickel, cobalt or the like.

Leaching Reaction $$MO + H_2SO_4 \Rightarrow MSO_4 + H_2O \quad (1)$$

(additionally, in the formula, M represents Ni, Co, Fe, Zn, Cu, Mg, Cr, Mn, or the like).

$$2Fe(OH)_3 + 3H_2SO_4 \Rightarrow Fe_2(SO_4)_3 + 6H_2O \quad (2)$$

$$FeO + H_2SO_4 \Rightarrow FeSO_4 + H_2O \quad (3)$$

High Temperature Hydrolysis Reaction $$2FeSO_4 + H_2SO_4 + \tfrac{1}{2}O_2 \Rightarrow Fe_2(SO_4)_3 + H_2O \quad (4)$$

$$Fe_2(SO_4)_3 + 3H_2O \Rightarrow Fe_2O_3 + 3H_2SO_4 \quad (5)$$

Although not particularly limited, the slurry concentration of the leached slurry in leaching step S1 is preferably adjusted in a range from 15 to 45% by weight. Moreover, although not particularly limited, the added amount of sulfuric acid used in leaching step S1 is preferably set to such an excessive amount as to leach iron from ores. For example, the added amount is set to 300 to 400 kg per ton of the ores. The added amount of sulfuric acid exceeding 400 kg per ton is not desirable due to the increased sulfuric acid cost.

(Solid-Liquid Separation Step)

In solid-liquid separation step S2, the leached slurry formed in leaching step S1 is subjected to multi-step washing steps so that a leached liquid containing nickel and cobalt and leached residues are obtained.

As the multi-step washing method in solid-liquid separation step S2, although not particularly limited, a counter current decantation method (CCD method) in which the leached slurry is made in contact with a washing liquid without containing nickel as a counter current is preferably used. With this method, the washing liquid to be newly introduced into the system can be reduced, and the recovery rate of nickel and cobalt can be set to 95% or more.

(Neutralizing Step)

In neutralizing step S3, by adding calcium carbonate so as to suppress oxidation of the leached liquid separated in solid-liquid separation step S2, while reducing the pH of the leached liquid to 4 or less, a mother liquor for use in recovering nickel and a neutralized precipitate slurry containing trivalent iron are formed. In neutralizing step S3, by carrying out the neutralizing step on the leached liquid in this manner, the excessive acid used in leaching step S1 by the use of the high-temperature pressure acid leaching is neutralized, and trivalent iron ions, aluminum ions or the like, remaining in the solution can also be removed.

The pH of the leached liquid to be adjusted in leaching step S3 is set to 4 or less, as described earlier, and preferably in a range from 3.2 to 3.8. When the pH of the leached liquid exceeds 4, more nickel hydroxides are generated.

Moreover, in neutralizing step S3, upon removing trivalent iron ions remaining in the solution, it is preferable not to oxidize iron ions located in the solution as divalent ions. For this reason, for example, the solution is preferably prevented from being oxidized due to air blowing or the like thereto to the utmost. Thus, it is possible to suppress the amount of calcium carbonate consumption caused by removal of divalent iron and the increased amount of generation of the neutralized precipitate slurry. That is, it becomes possible to reduce the nickel recovering loss of the precipitate due to the increase of the amount of the neutralized precipitate slurry.

Furthermore, the neutralized precipitate slurry obtained in neutralizing step S3 can be sent to solid-liquid separation step S2, if necessary. Consequently, nickel contained in the neutralized precipitate slurry can be effectively recovered. More specifically, by repeating the neutralized precipitate slurry to solid-liquid separation step S2 operated under a low pH condition, simultaneously with a washing process of the leached residues, the dissolution of nickel hydroxides generated by a local reaction of the neutralized precipitate with adhered water on the surface of the neutralized precipitate can be accelerated, thereby making it possible to reduce nickel components to cause a recovery loss. Additionally, simultaneously with nickel, one portion of the hydroxides of iron is again dissolved, with the result that the neutralizer is sometimes required again for securing leached trivalent iron ions. For this reason, from the viewpoint of this also, it is desirable to prevent divalent iron ions from being oxidized and consequently to reduce the amount of the neutralized precipitate.

The reaction temperature in neutralizing step S3 is preferably set in a range from 50 to 80° C. In the case of the reaction temperature of less than 50° C., the neutralized precipitate containing trivalent iron ions to be formed becomes finer to cause adverse influences to the processes of solid-liquid separation step S2 to which the neutralized precipitate is circulated, if necessary. In contrast, in the case of the reaction temperature exceeding 80° C., a reduction in corrosion resistance of the device materials and an increase in energy costs for heating are caused.

(Sulfurizing Step)

In sulfurizing step S4, by blowing hydrogen sulfide gas into the sulfuric acid aqueous solution serving as a mother liquor for use in recovering nickel obtained in the neutralizing step S3, a sulfurizing reaction is exerted so that sulfides containing nickel and a barren liquid are generated.

As described earlier, in the present embodiment, the sulfides (nickel sulfides) containing nickel that have been adjusted to have an average particle size of a predetermined size or larger are added to the sulfuric acid aqueous solution as seed crystals. With this arrangement, upon carrying out the precipitate separation treatment for separating the sulfide slurry generated in the sulfurizing reaction into sulfides serving as the precipitate and a barren liquid, the concentration of fine floating solid components containing nickel in an overflow liquid can be reduced to increase nickel components to be formed into precipitates as sulfides, thereby making it possible to reduce the nickel recovery loss.

The added amount of the nickel sulfides forming seed crystals is preferably set to an amount corresponding to 4 to 6 times the nickel amount, relative to the amount of nickel contained in the mother liquor. With this arrangement, it becomes possible to suppress the adhesion of generated sulfides onto the inner surface of the reaction container, and also to stabilize the nickel concentration in the barren liquid at a further lower level.

Moreover, with respect to the nickel sulfides to be added as seed crystals, sulfides, which are classified and particle-size adjusted so as to have an average particle size of a predetermined size or larger, after having been generated in sulfurizing step S4 and recovered through the precipitate separation treatment, are preferably circulated and utilized. Additionally, prior to the classifying treatment, a process for grinding the sulfides may be carried out, if necessary.

The mother liquor is a sulfuric acid aqueous solution generated by leaching nickel oxidized ores as described earlier, and is obtained through neutralizing step S3. More specifically, as the mother liquor, for example, a sulfuric acid aqueous solution having a pH value of 3.2 to 4.0, a nickel concentration of 2 to 5 g/L and a cobalt concentration of 0.1 to 1.0 g/L, which also contains iron, magnesium, manganese, or the like as impurity components, may be used. Although the impurity components greatly fluctuate depending on a redox electric potential of leaching, operation conditions of an autoclave, and ore qualities, those components generally contain iron, magnesium and manganese of about several g/L. In this case, a comparatively large amount of the impurity components exist relative to nickel and cobalt to be recovered; however, iron, manganese, alkali metals, and alkali-earth metals such as magnesium, which have low stability as sulfides, are not contained in the sulfides to be generated.

Additionally, in the case when zinc is contained in the mother liquor, prior to a treatment for generating nickel or the like as sulfides through a sulfurizing reaction, a treatment for use in selectively separating zinc as sulfides may be carried out. As the treatment for use in selectively separating zinc, such a treatment is proposed in which, upon carrying out a sulfurizing reaction, by forming weak conditions so as to suppress the rate of the sulfurizing reaction, coprecipitation of nickel having a high concentration in comparison with zinc is suppressed so as to selectively remove zinc.

In this manner, in sulfurizing step S4, sulfides containing nickel containing hardly any impurities and a barren liquid in which the nickel concentration is stabilized at a low level are generated and recovered. More specifically, the slurry of sulfides obtained through the sulfurizing reaction is subjected to precipitating and separating treatments by using a precipitation and separation device, such as a thickener or the like, the sulfides corresponding to the precipitate are separated and recovered from the bottom portion of the thickener, with an aqueous solution component being overflowed and recovered as a barren liquid. Additionally, this barren liquid has a pH value of about 1 to 3, and contains impurity elements, such as iron, magnesium, manganese, or the like, that are contained therein without having been sulfurized.

In the present embodiment, as described earlier, by adding nickel sulfides that are particle-size adjusted so as to have an average particle size of a predetermined size or larger as seed crystals, a sulfurizing reaction is carried out so that it is possible to lower a concentration of fine floating solid components containing nickel that are contained in an overflow liquid at the time of precipitating and separating treatments. Thus, the barren liquid to be discharged out of the system is brought into a state in which hardly any nickel is contained so that the nickel recovery loss can be reduced. Moreover, since hardly any nickel is contained therein in this manner, it becomes possible to prevent hydroxides from being generated even in the case when the barren liquid is reused as a washing liquid in solid-liquid separation step S2.

4. Examples

The following description will discuss examples of the present invention; however, the present invention is not intended to be limited by the examples described hereinbelow.

EXAMPLES

A nickel sulfuric acid aqueous solution (starting liquid) for use in the following examples and comparative example was a mother liquor which was composed of a sulfuric acid aqueous solution containing nickel recovered through a leaching step, a solid-liquid separating step and a neutralizing step in a hydrometallurgical method based upon a high-temperature pressure leaching process for use in recovering nickel from nickel oxidized ores, and had a nickel concentration of 4 g/L and a pH value of 3.5. Moreover, metals used in the examples and comparative examples were analyzed by using an ICP emission spectral analysis.

Example 1

By using a sulfurizing treatment system 10 shown in FIG. 1, the following sulfurizing step was carried out. That is, a nickel sulfuric acid aqueous solution was loaded into a stirring reaction vessel 11 as a starting liquid, and a nickel sulfide (MS), which was generated by a sulfurizing reaction and adjusted so as to have an average particle size of 55 μm, was added to this starting liquid as seed crystals, while controlling a reaction temperature in a range of 70 to 80° C., so as to have a nickel amount of 4 to 5 times higher than the amount of nickel contained in the starting liquid.

In this case, as the nickel sulfide thus added, a nickel sulfide having an average particle size of 55 μm, which was derived from sulfides obtained by a sulfurizing reaction and recovered from the bottom of a thickener (precipitation vessel 12) so as to be used for circulation through a relay vessel 13, and classified by a liquid cyclone (classifying device 14) and then measured by a laser diffraction-type grain size distributing device [SALD-201V, made by Simadzu Corporation] (grain size measuring device 15), was used.

Additionally, the flow rate of the starting liquid was altered within a range from 200 to 450 m$^3$/hr, and in cooperation with this, the circulation flow rate into the stirring reaction vessel 1 of the nickel sulfides obtained from the thickener was adjusted.

Moreover, while blowing hydrogen sulfide gas into the nickel sulfuric acid aqueous solution to which the seed crystals had been added, a sulfurizing reaction was carried out.

Successively, a sulfide slurry generated by the sulfurizing reaction was sent to the thickener (precipitation vessel 12) where precipitating and separating treatments for separating the slurry into sulfides containing nickel and a barren liquid were carried out. The supply flow rate into the thickener was set to 400 m$^3$/hr. Then, at this time, a floating solid component concentration in a thickener overflow liquid to form the barren liquid and a nickel concentration in the thickener overflow liquid were found.

As a result, the floating solid component concentration in the thickener overflow liquid was 58 mg/L and the nickel concentration was lower than 0.1 g/L corresponding to the detection lower limit.

Comparative Example 1

A sulfurizing reaction was carried out in the same manner as in example 1, except that nickel sulfides generated in the sulfurizing reaction and recovered therefrom, as they were, were added to a nickel sulfuric acid aqueous solution serving as a starting liquid as seed crystals, without carrying out adjustments on their average particle size. Then, in the same manner as in example 1, a floating solid component concentration and a nickel concentration in a thickener overflow liquid in the precipitating and separating treatments were found. Additionally, when the average particle size of the nickel sulfides added as the seed crystals were measured, it was found to be 45 μm.

As a result, although the nickel concentration in the thickener overflow liquid was less than 0.1 g/L corresponding to the detection lower limit, the floating solid component concentration therein was 110 mg/L that was nearly 2 times higher than that of example 1.

The following table 1 collectively shows the results of measurements in example 1 and comparative example 1.

TABLE 1

| | Nickel sulfide (seed crystal) average particle size (μm) | Floating solid component concentration in overflow liquid (mg/l) | Nickel concentration in overflow liquid (g/l) |
| --- | --- | --- | --- |
| Example 1 | 55 | 58 | <0.1 |
| Comparative Example 1 | 45 | 110 | <0.1 |

As described above, it was found that by carrying out a sulfurizing reaction by the use of the nickel-containing sulfides with the average particle size being particle-size adjusted to a predetermined size or larger as seed crystals, the concentration of fine floating solid components in an overflow liquid overflowed in the precipitating and separating treatments could be lowered. In particular, in the case when nickel sulfides with the average particle size being adjusted to 55 μm or more were added as seed crystals, the concentration of fine floating solid components in the overflow liquid could be cut to about half in comparison with the case in which nickel sulfides, as they were, without having been particle-size adjusted, were circulated and used.

Therefore, it is found that since the fine floating solid components in the overflow liquid forming a nickel recovery loss are lowered in this manner, nickel can be recovered at a higher recovery rate.

REFERENCE SIGNS LIST

10 ... sulfurizing treatment system, 11 ... stirring reaction vessel, 12 ... precipitation vessel, 13 ... relay vessel, 14 ... classifying device, 15 ... grain size measuring device

The invention claimed is:

1. A nickel recovery loss reduction method comprising the steps of:
    blowing a hydrogen sulfide gas into a sulfuric acid aqueous solution containing nickel and cobalt recovered through a leaching step, a solid-liquid separating step and a neutralizing step in a hydrometallurgical method based upon a high-temperature pressure leaching process for recovering nickel from nickel oxidized ores, carrying out a sulfurizing treatment in which a sulfurizing reaction is executed to generate sulfides containing nickel and a barren liquid,
    wherein sulfides containing nickel that have been recovered through the sulfurizing step are circulated and used again and the sulfides which have an average particle size of 55 μm or more obtained by classifying the sulfides in a liquid cyclone are added to the sulfuric acid aqueous solution as seed crystals.

2. A hydrometallurgical method of nickel oxidized ores based upon a high-temperature pressure leaching process for recovering nickel from the nickel oxidized ores, comprising the steps of:
    blowing a hydrogen sulfide gas into a sulfuric acid aqueous solution containing nickel and cobalt recovered through a leaching step, a solid-liquid separating step and a neutralizing step, carrying out a sulfurizing treatment in which a sulfurizing reaction is executed to generate sulfides containing nickel and a barren liquid,
    wherein sulfides containing nickel that have been recovered through the sulfurizing step are circulated and used again and the sulfides which have an average particle size of 55 μm or more obtained by classifying the sulfides in a liquid cyclone are added to the sulfuric acid aqueous solution as seed crystals.

3. A sulfurizing treatment system for use in a sulfurizing treatment in which by blowing a hydrogen sulfide gas into a sulfuric acid aqueous solution containing nickel and cobalt recovered through a leaching step, a solid-liquid separating step and a neutralizing step in a hydrometallurgical method based upon a high-temperature pressure leaching process for recovering nickel from nickel oxidized ores, a sulfurizing reaction is executed to generate sulfides containing nickel and a barren liquid, comprising:
    a stirring reaction vessel to which the sulfuric acid aqueous solution is loaded and in which by blowing the hydrogen sulfide gas to the sulfuric acid aqueous solution, a sulfurizing reaction is carried out;
    a precipitation vessel for precipitating and separating a sulfide slurry generated by the sulfurizing reaction into the sulfides and the barren liquid;
    a relay vessel for holding the sulfides separated in the precipitation vessel and for distributing the sulfides at a predetermined ratio; and
    a classifying device for classifying a predetermined amount of the sulfides distributed in the precipitation vessel at a predetermined classifying point,
    wherein the classifying device is a liquid cyclone and the sulfides obtained by classifying in the liquid cyclone that have an average particle size of 55 μm or more are circulated and supplied to the stirring reaction vessel by using a pump, and
    wherein in the stirring reaction vessel, a sulfurizing reaction is carried out by using the sulfides that have been circulated and supplied as seed crystals.

4. The sulfurizing treatment system according to claim 3, further comprising:
    a grain size measuring device for measuring the grain size of the sulfides that have been classified in the classifying device.

* * * * *